United States Patent
Ishizuka (10) Patent No.: US 9,499,137 B2
(45) Date of Patent: Nov. 22, 2016

(54) BRAKE CONTROL DEVICE FOR A VEHICLE

(75) Inventor: Motoi Ishizuka, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 395 days.

(21) Appl. No.: 14/236,302

(22) PCT Filed: Sep. 14, 2012

(86) PCT No.: PCT/JP2012/073584
§ 371 (c)(1),
(2), (4) Date: Jan. 30, 2014

(87) PCT Pub. No.: WO2013/042620
PCT Pub. Date: Mar. 28, 2013

(65) Prior Publication Data
US 2014/0174072 A1    Jun. 26, 2014

(30) Foreign Application Priority Data

Sep. 20, 2011  (JP) .................................. 2011-204133

(51) Int. Cl.
*F15B 7/00*     (2006.01)
*B60T 7/04*     (2006.01)
*B60T 8/40*     (2006.01)

(52) U.S. Cl.
CPC ............. *B60T 7/042* (2013.01); *B60T 8/4013* (2013.01); *B60T 8/4081* (2013.01)

(58) Field of Classification Search
CPC .... B60T 7/042; B60T 8/4013; B60T 8/4081; B60T 8/04086; B60T 13/146
See application file for complete search history.

(56) References Cited

U.S. PATENT DOCUMENTS 8,366,207 B2 *  2/2013  Hironaka .............. B60T 7/042
                                                303/116.1

FOREIGN PATENT DOCUMENTS

| EP | 2199161 A1 | 6/2010 |
| JP | 11-115737 A | 4/1999 |
| JP | 2004-268868 A | 9/2004 |
| JP | 2005-35387 A | 2/2005 |
| JP | 2005-153555 A | 6/2005 |
| JP | 2006-219101 A | 8/2006 |

OTHER PUBLICATIONS

Search Report issued in corresponding European Application No. 12833420.8, mailed Nov. 17, 2014 (8 pages).
International Search Report for corresponding International Application No. PCT/JP2012/073584, mailed Nov. 27, 2012 (4 pages).

* cited by examiner

*Primary Examiner* — Michael Leslie
(74) *Attorney, Agent, or Firm* — Osha Liang LLP (57) ABSTRACT

A brake control device for a vehicle has a master cylinder that converts an operating force of a brake pedal to a fluid pressure, a wheel cylinder installed in each wheel of the vehicle that generates a braking force by a fluid pressure introduced in each wheel, an introduction section that introduces the fluid pressure generated by the master cylinder, a first switching valve disposed in a fluid passage connecting the master cylinder and the wheel cylinder, and closes at system startup and opens at system non-startup/failure, a second switching valve disposed in a branch fluid passage connecting the master cylinder and the introduction section and opens at the system startup and closes at the system non-startup/failure, and a brake controller. When the system is started after the depression operation of the brake pedal, the brake controller closes the second switching valve.

12 Claims, 3 Drawing Sheets

BRAKE CONTROL DEVICE FOR A VEHICLE

CROSS-REFERENCE TO RELATED APPLICATIONS

This application claims priority based on Japanese Patent Application No. 2011-204133 filed in Japan Patent Office on Sep. 20, 2011, the content of which is incorporated herein by reference in its entirety.

BACKGROUND

Technical Field

The present invention relates to a brake control device for a vehicle by a so-called semi-brake-by-wire system with the ability to secure the pedal stroke by allowing the inflow of brake fluid generated by the braking operation, while to ensure the brake fluid pressure due to braking operation during a system failure.

Related Art

In the brake control system of semi-brake-by-wire system, if the system is started after depression of a brake pedal, the stroke will be elongated or extended (i.e. a state in which the reaction force is smaller than normal, despite a larger stroke of pedal than normal) so that a sense of discomfort or strange feeling is imparted to the driver.

To avoid this strange feeling due to the elongation of the brake stroke, when the system is started or actuated after depression of the brake pedal, such a control is known in which a second switching valve is closed to prevent fluid from flowing into a stroke simulator (for example, see JP Patent Application Publication No. 2004-268868).

SUMMARY

However, in the brake control device of a conventional vehicle, when the system starts after the operation of the brake pedal, both a first switching valve (at system start-up: open→closed) and a second switching valve are closed so that the fluid flow into a valve wheel cylinder and the fluid flow into a stroke simulator are both shut off. Thus, the brake pedal won't develop a further stroke so that, although the discomfort of the elongation or extension of pedal stroke may be eliminated, instead, an uncomfortable feeling of stepping on hard or stiff board will be encountered.

A brake control device for a vehicle according to one or more embodiments of the present invention eliminates the pedal operational discomfort, when the system starts after depression of the brake pedal.

A brake control device according to one or more embodiments of the present invention comprises a master cylinder, a wheel cylinder, an introduction section, a first switching valve, a second switching valve, and a brake control unit.

The master cylinder converts an operating force of a brake pedal to a fluid pressure.

The wheel cylinder is installed in each wheel and generates a braking force by a fluid pressure introduced.

The introduction section introduces the fluid pressure generated by the master cylinder.

The first switching valve is disposed in a fluid passage that connects the master cylinder and the wheel cylinder, and is configured to close at the system startup and to open at the time of system non-startup/failure.

The second switching valve is disposed in a branch fluid passage that connects the master cylinder and the introduction section, and is configured to open at the system startup and to close at the system non-startup/failure.

The brake control unit is operative, when the system is started after the depression operation of the brake pedal, to close the second switching valve, and, when the fluid pressure or fluid pressure generated by the master cylinder increases, to cause the second switching valve to open for flowing the brake fluid to the introduction section.

Therefore, when the system starts up after depression of the brake pedal, the brake control unit is operative to close a second switching valve.

By the closing operation of the second switching valve, the flow of brake fluid to the introductory section is cut off, and the pedal stroke is suppressed at the system startup. Therefore, the "elongation of stroke" is prevented, which would be caused by leaving the second switching valve open and allowing the introduction of brake fluid into the introduction section. Then, when the fluid pressure generated by the master cylinder rises or increases with the pedal stroke being still suppressed, the brake control unit causes the second switching valve to open.

By the opening operation of the second switching valve, since the brake fluid flows in the introduction section responsive to the opening operation, a progressive depressing operation of the brake is allowed with the pedal reaction force being received. Therefore, the "feeling of stepping on stiff board" is prevented, which occurs due to shutting off the brake fluid from flowing into the introduction section while leaving the second switching valve open. As a result, when the system was started after the brake pedal being depressed, it is possible to eliminate the discomfort in the pedal operation.

DETAILED DESCRIPTION

Embodiments of the present invention is now described with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First, description is given of a configuration.

With respect to the configuration in a brake control device according to one or more embodiments of the present invention, "Overall System Configuration" and "Brake Control Configuration" are separately described.

[Overall System Configuration]

Figure 1:
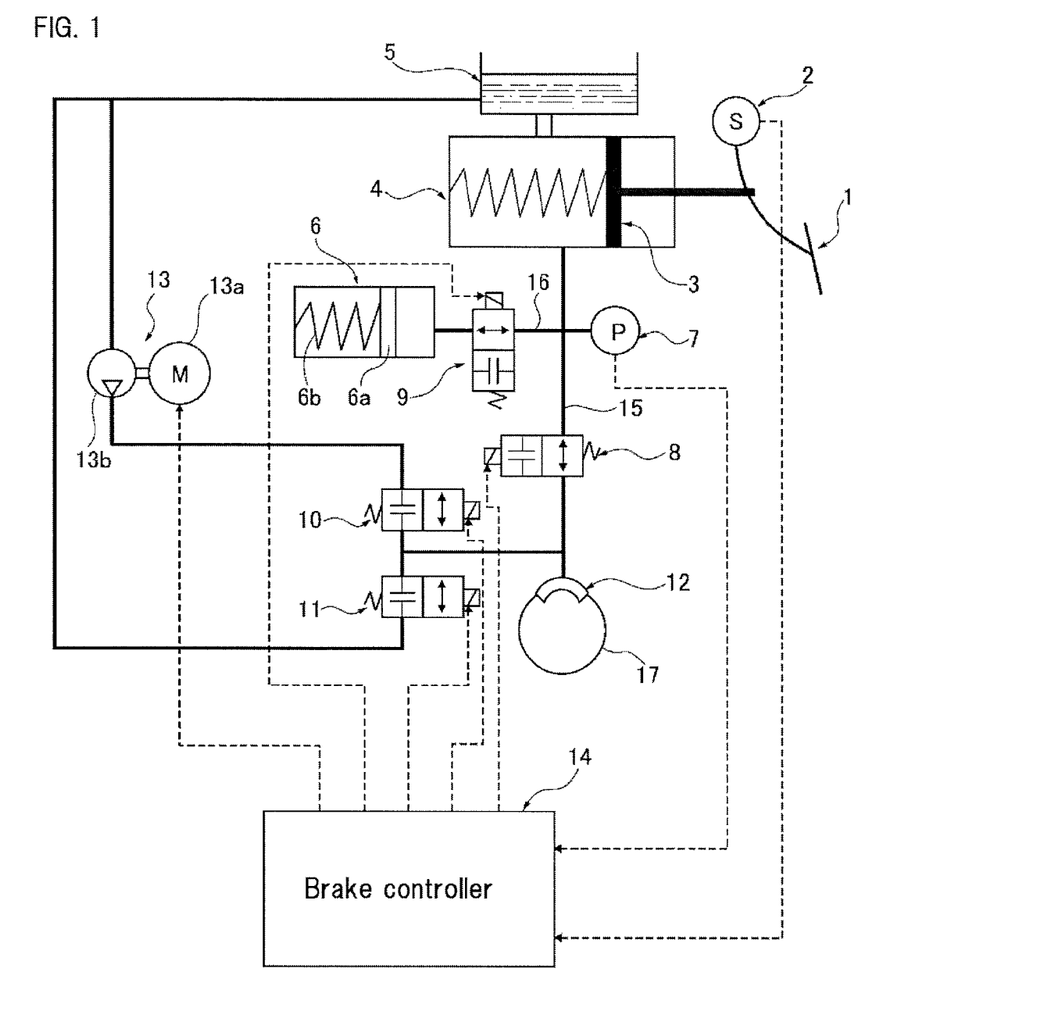
FIG. 1 is an overall system diagram showing a brake control device of the semi-brake-by-wire system to which a brake control apparatus for a vehicle is applied, according to one or more embodiments of the present invention.

FIG. 1 shows a brake control system (shown for only one wheel) by a semi-brake-by-wire method to which the brake control device for a vehicle is applied, according to one or more embodiments of the present invention. The overall system configuration is shown below with reference to FIG. 1. Note that the hardware configuration of the entire system for a four-wheel vehicle is similar to that described in JP 2004-268868 A, for example.

As shown in FIG. 1, the brake control system is provided with a brake pedal 1, a stroke sensor 2, a piston 3, a master cylinder 4, a reservoir 5, a stroke simulator (introduction section), a pressure sensor 7, a wheel cylinder cut valve 8 (first switching valve), a stroke simulator cut valve 9 (second switching valve), an increasing valve 10, a pressure reducing valve 11, a wheel cylinder 12, a pressure increasing or booster device 13, and a brake controller 14.

The master cylinder 4 converts an operating force of the brake pedal 1 to a fluid pressure or fluid pressure. That is, when the piston 3 which is connected to the brake pedal 1 strokes to the left in FIG. 1 in response to closing of a communication port with the reservoir 5, a fluid pressure is generated corresponding to the operating force to the brake pedal 1. Note that the brake pedal 1 is provided with a stroke sensor 2 for detecting the pedal stroke.

The stroke simulator 6 introduces the hydraulic pressure generated by the master cylinder 4 and produces a pedal reaction force. More specifically, by introducing the fluid pressure generated by the master cylinder 4 due to opening of the stroke simulator cut valve 9, the stroke simulator 6 caused the piston 6a to stroke against the urging force of the return spring 6b. The stroke-fluid pressure characteristics (standard characteristics: see FIGS. 3 to 5) realized by the stroke simulator 6 is determined by a quadratic characteristic curve in accordance with a fluid pressure from the master cylinder 4, area of receipt of the piston 6a, urging force of the return spring 6b, etc. Further, a pedal stroke is secured by an brake fluid absorption amount due to stroke of the piston 6a, and, at the same time, a pedal reaction force will be imparted to the brake pedal 1 by a fluid pressure obtained by multiplying a fluid pressure from the master cylinder 4 and the receiving area of the piston 3.

The wheel cylinder cut valve 8 is provided in the fluid passage 15 that connects the master cylinder 4 and the wheel cylinder 12, and is configured in a normally open solenoid valve that is closed during system start-up and is open at system being in a non-startup or malfunctions.

The stroke simulator cut valve 9 is provided in a branch hydraulic passage 16 connecting the master cylinder 4 and the stroke simulator 6, and is formed in a normally closed solenoid valve that opens at system startup and closes at the time of a system non startup/failure.

The wheel cylinder 12 is provided in each wheel and configured, in response to a hydraulic pressure introduced from either the master cylinder 4 or the booster device 13, to clamp under pressure a brake disk disposed on the axle to generate a braking force to brake the rotational movement of each wheel.

The booster device 13, when boosted after the system startup, generates a boosted fluid pressure to be introduced into the wheel cylinder 12 separately from the fluid pressure from the master cylinder 4. This booster device 13 is composed of a pump motor 13a and a fluid pressure pump 13b. When boosting, a pressure increasing valve 10 (normally closed solenoid valve) is opened while a pressure reducing valve 11 (normally closed solenoid valve) is closed so as to introduce a pump delivery pressure to the wheel cylinder 12. On the other hand, when reducing pressure, the pressure increasing valve 10 is closed while the pressure reducing valve 11 is opened to return the fluid pressure of the wheel cylinder 12 to the reservoir 5. Further, when maintaining the pressure, both the pressure increasing valve 10 and the pressure reducing valve 11 are closed to maintain the fluid pressure of the wheel cylinder 12.

The brake controller 14 receives pedal stroke information from the stroke sensor 2, the fluid pressure information from the pressure sensor 7, and the like, and performs a predetermined arithmetic processing. Based on the processing results, solenoid drive commands are output to each of the solenoids associated with the wheel cylinder cut valve 8, the stroke simulator cut valve 9, the pressure increasing valve 10, and the pressure decreasing valve 11. At the same time, a motor drive command is sent to the pump motor 13a of the booster device 13. This brake controller 14 is operative, responsive to a system startup after the depressing operation of the brake pedal 1, to close the stroke simulator cut valve 9. Further, when the fluid pressure generated by the master cylinder 4 is increased, in accordance with the increase amount in the fluid pressure, the stroke simulator cut valve 9 is opened to cause brake fluid to flow in the stroke simulator 6. In addition, when performing a return operation of the brake pedal 1 after depression, the wheel cylinder cut valve 8 will be closed. Subsequently, when the fluid pressure generated by the master cylinder 4 is reduced, in accordance with the reduction amount of fluid pressure, the wheel cylinder cut valve 8 is opened so as to introduce the boosted fluid pressure from the booster device 13 to the master cylinder 4. In both operations, both the wheel cylinder cut valve 8 and the stroke simulator cut valve 9 are controlled to selectively open and close in order to match the normal stroke-fluid pressure characteristics.

[Brake Control Configuration]

Figure 2:
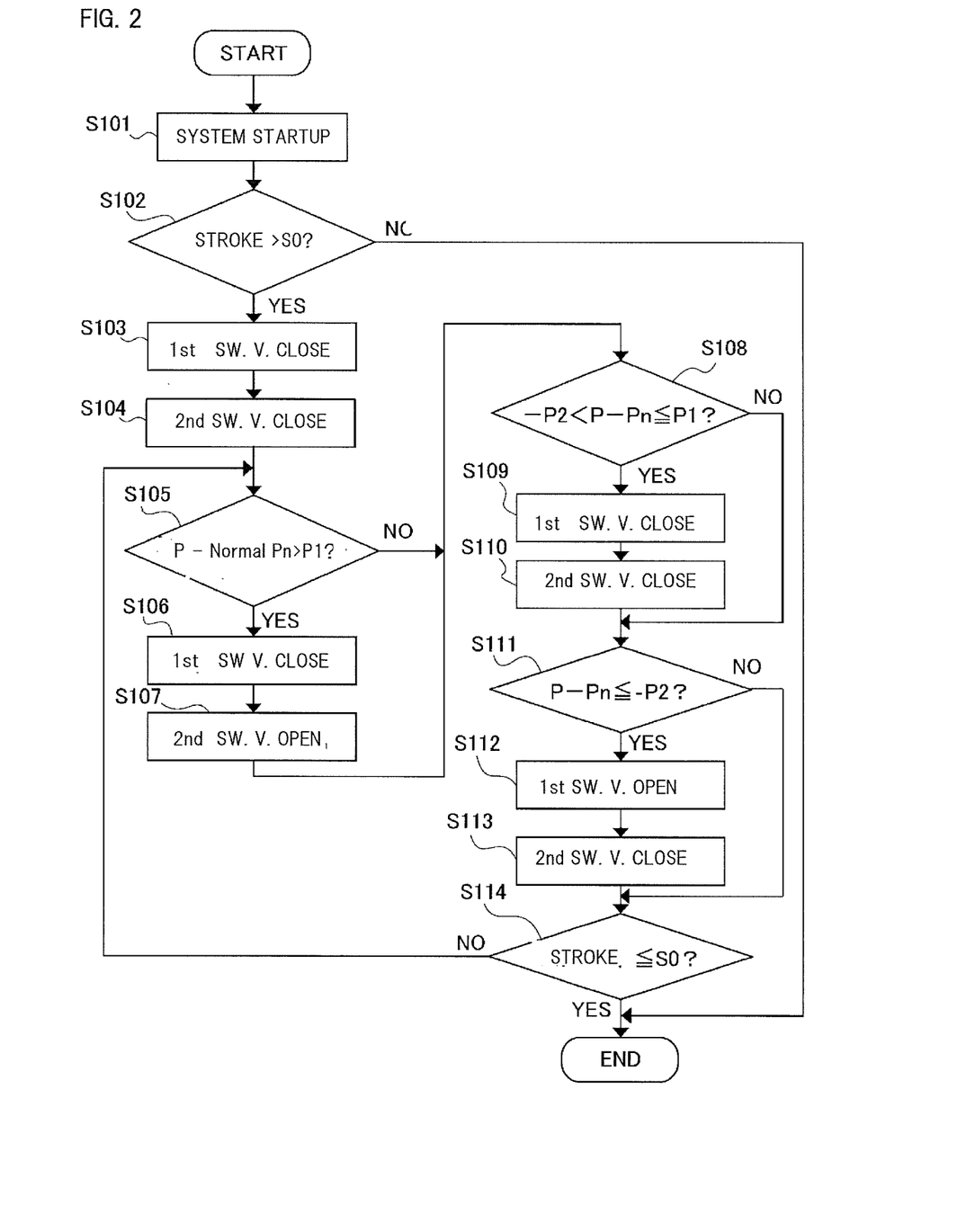
FIG. 2 is a flowchart showing a flow of the brake control process executed by a brake controller of the brake control device for a vehicle to which the brake control system is applied, according to one or more embodiments of the present invention.

FIG. 2 is a flowchart showing a flow of the brake control process executed by a brake controller 14 of the brake control device for a vehicle to which the brake control system is applied, according to one or more embodiments of the present invention. Each step in FIG. 2 representing the brake control configurations will now be described below.

In Step S101, the system is started in accordance with the start of a brake control process by the brake controller 14, and process proceeds to step S102.

In step S102, subsequent to the system startup in step S101, it is determined whether or not the brake pedal stroke amount (hereinafter, simply referred to as "stroke") detected by the stroke sensor 2 exceeds a threshold S0. The process proceeds to step S103 if YES (the stroke>S0), whereas the process proceeds to the end if NO (stroke≤S0) and the control is terminated.

In step S103, the judgment that the stroke is greater than S0, i.e., stroke>S0 in step S102, in other words, the determination that the system has been started after depression of the pedal, a command to close a wheel cylinder cut valve 8 (first switching valve) is output and the control proceeds to step S104.

In Step S104, following the closing command output to the wheel cylinder cut valve 8 in step S103, a command to close the stroke simulator cut valve 9 (second switching valve) is output and control proceeds to step S105.

In Step S105, subsequent to the closing command output to the stroke simulator cut valve 9 in step S104 or the determination in step S114 of the stroke being greater than S0, it is determined that a difference pressure obtained by subtracting a normal characteristic fluid pressure Pn from a fluid pressure P from the pressure sensor 7 exceeds a threshold P1. If YES (i.e. P−Pn>P1), control proceeds to step S106, whereas, if NO (i.e. P−Pn≤P1), control proceeds to step S108.

Figure 3:
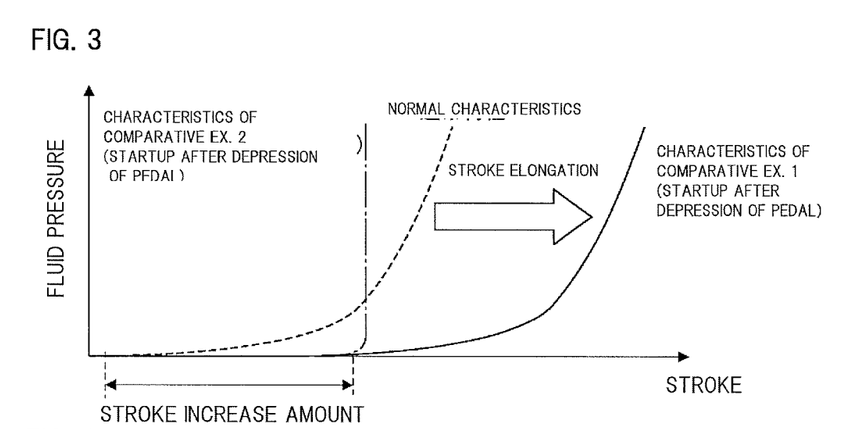
FIG. 3 is a stroke-fluid pressure diagram showing the extension effect when the system is started after depression operation of the pedal in a brake control system for a vehicle in a comparative example.
Figure 4:
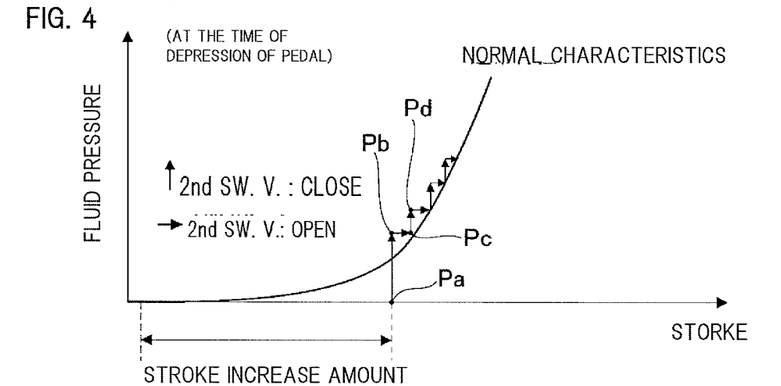
FIG. 4 is a stroke-fluid pressure diagram showing elimination of discomfort with the pedal operation when the system is started after depression operation of the pedal in the brake control device for a vehicle according to one or more embodiments of the present invention.
Figure 5:
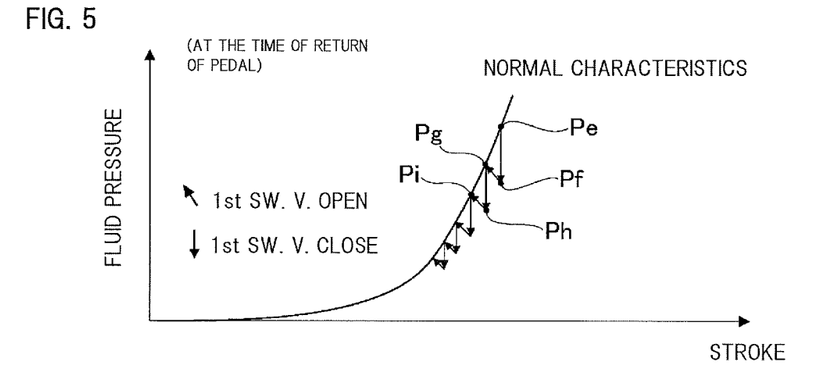
FIG. 5 is a stroke-fluid diagram showing elimination of a defective return of pedal subsequent to the pedal depression when the system is started after depression operation of the pedal in the brake control device for a vehicle according to one or more embodiments of the present invention.

Note that the normal characteristic fluid pressure Pn is determined based on an output value of the stroke signal with reference to a map storing the "normal or standard characteristics" shown in FIGS. 3 to 5.

In Step S106, subsequent to judging that the P−Pn>P1 in step S105, that is, after judging that the driver is progressively depressing the pedal stroke, a command to close the wheel cylinder cut valve 8 (first switching valve) and the process proceeds to step S107.

In Step S107, following the closing command output to the wheel cylinder cut valve 8 in step S106, a command to open the stroke simulator cut valve 9 (second switching valve), the process proceeds to step S108.

In Step S108, following the determination of P−Pn≤P1 at step S105, or the opening command output to the stroke simulator cut valve 9 in step S107, it is determined whether or not the difference pressure obtained by subtracting the normal characteristic hydraulic pressure Pn from the fluid pressure P of the pressure sensor 7 exceeds the threshold (−P2) and falls equal to or less than the threshold P1. If YES, i.e., (−P2<P−Pn≤P1), control proceeds to step S109, while if NO (i.e., P−Pn>P1, or P−Pn≤−P2), control proceeds to step S111.

In Step S109, subsequent to the judgment (−P2<P−Pn≤P1) in step S108, that is, following the determination that the braking operation of the driver is constant, a command to close the wheel cylinder cut valve 8 (first switching valve) is output and the control proceeds to step S110.

In Step S110, following the closing command output to the wheel cylinder cut valve 8 in step S109, a command to close the stroke simulator cut valve 9 (second switching valve) is output and the process proceeds to step S111.

In Step S111, following the judgment of (P−Pn>P1) in step S108 or the judgment (P−Pn≤−P2) in step S108, or following the closing command output to the stroke simulator cut valve 9 in step S110, it is determined whether or not a difference pressure obtained by subtracting the normal characteristic fluid pressure Pn from the fluid pressure P by the pressure sensor 7 is equal to or below the threshold (−P2). If YES (i.e., P−Pn the process proceeds to step S114, while, if NO (i.e., P−Pn>−P2), then control proceeds to step S114.

In Step S112, subsequent to judging that the P−Pn≤−P2 in step S111, that is, after judging that the driver attempts to return the brake pedal 1, a command to open the wheel cylinder cut valve 8 (first switching valve) is output and the process proceeds to step S113.

In Step S113, following the opening command output to the wheel cylinder cut valve 8 in step S112, a command to close the stroke simulator cut valve 9 (second switching valve) is output and the process proceeds to step S114.

In Step S114, following the determination of (P−Pn>−P2) in step S111, or the closing command output to the stroke simulator cut valve 9 in step S113, it is determined whether or not the stroke sensed by the stroke sensor 2 is equal to or less than a threshold value S0. If YES, (i.e., stroke≤S0), it is determined that the brake pedal has returned to an initial position and process proceeds to the END to conclude the present control. If NO (stroke>S0), control returns to step S105 to continue the present control.

Now, operation will be described.

First, description is given of a comparative example. Then, the operations of the brake control device are discussed by separating a "normal brake control operation due to the depressing operation after system startup", "control operation to the side of progressive depression of the pedal at the time of system startup after the depression", and "control operation to the side of returning of the pedal at the time of system startup after depression", respectively.

Comparative Example

At the time of a system non-startup/failure, a first switching valve to communicate the fluid pressure of the master cylinder to flow to the wheel cylinder and a second switching valve that limits the fluid pressure introduction into the stroke simulator are provided. In this brake control system of this semi-brake-by-wire method, such a system is referred to as the comparative example 1 where the first switching valve is closed and the second switching valve is opened.

In this comparative example 1, when the system has been started after a depressing operation on the brake pedal, after the brake fluid has flown into the wheel cylinder (i.e. after being stroked), the stroke simulator is activated. Therefore, as shown by the solid characteristic line in FIG. 3, the stroke has already been completed by the stroke increment or increase amount prior to system startup. Subsequently, in spite of the pedal being depressed larger than normal (normal characteristics indicated by the dotted line in FIG. 3), because the brake fluid flows into the stroke simulator, the pedal reaction force becomes smaller than normal so that the stroke is extended or elongated. Therefore, in the Comparative Example 1, the stroke elongation gives the driver a feeling of discomfort.

Then, in the brake control system of semi-brake-by-wire method, as a counter measure to cope with the stroke elongation, such a device is referred to as the Comparative Example 2 in which, when the system is started up after the depressing operation of the brake pedal, as long as the depression of the brake pedal is not released, the second switching valve is closed in order for the brake fluid not to flow in the stroke simulator.

In this Comparative Example 2, when the system starts after depressing operation of the brake pedal, after the brake fluid has flown into the wheel cylinders (i.e., after being stroked), the system starts, and both the first and the second switching valves are closed together. Thus, as shown by the dot-chain characteristic line in FIG. 3, after the system startup, even when the pedal is depressed, since inflow of the brake fluid to the stroke simulator is disconnected, the brake pedal does no longer work to stroke at all. Therefore, although the stroke elongation associated discomfort in the Comparative Example 1 is eliminated, but another discomfort involving the feeling of stepping a plate, opposite to the discomfort associated with the elongation, will be given to the driver.

[Normal Brake Control Operation Due to the Depression After System Startup]

When the depression operation is done after system startup, in the flowchart of FIG. 2, the process proceeds to through steps S101, S102 up to END to conclude the brake control due to the system startup after depression operation to switch over a normal brake control. Description is now made of the normal brake control operation due to the depression operation after the system startup, below.

In the normal brake control after the system startup, the wheel cylinder cut valve 8 is closed and the stroke simulator cut valve 9 is opened. Therefore, when the driver depresses the brake pedal 1, a fluid pressure is generated in the master cylinder 4. At this time, since the stroke simulator cut valve 9 is being opened, the brake fluid flows into the stroke simulator 6 from the master cylinder 4 to cause the piston 3 subject to stroke operation to thereby allow for a stroke of the brake pedal while generating a pedal reaction force to the driver. As a result, when the brake pedal 1 is operated after the system startup, the stroke-fluid pressure characteristic shown as the "normal characteristics" in FIGS. 4 and 5 may be obtained.

At this time, the brake controller or control unit 14, based on the signal values of the stroke sensor 2 and fluid pressure 7, calculates the required fluid or hydraulic pressure from the driver. Then, in accordance with the required fluid pressure thus calculated, a wheel cylinder fluid pressure control is performed in which the fluid pressure in the wheel cylinder 12 is adjusted to achiever the required fluid pressure by actuating the booster device 13 and a combination of the increasing pressure valve 10 and pressure reducing valve 11.

In this way, during the normal brake control after system startup, by closing the wheel cylinder cut valve 8, the pedal reaction force production control in the braking operation system is disconnected from the wheel cylinder fluid or hydraulic pressure control in the brake fluid or hydraulic pressure generating system. For this reason, the brake control operation similar to the brake-by-wire method will be exhibited.

On the other hand, at the time such as system non-startup or system failure, the wheel cylinder cut valve 8 is opened while the stroke simulator cut valve 9 is closed. Accordingly, the fluid pressure is generated in the master cylinder 4 in response to the driver depressing on the brake pedal 1, the generated fluid pressure will be fed into the wheel cylinder 12 directly through the opened wheel cylinder cut valve 8. At this time, since the stroke simulator cut valve 9 is closed without causing brake fluid to flow in the stroke simulator, no stroke increase will be encountered.

Thus, at the time prior to the system startup or system failure, braking is secured by feeding the fluid pressure from the master cylinder 4 generated in response to the pedal operation. Therefore, different from the brake-by-wire system, in the system failure, the function of fail-safe will be ensured and a hydraulic pressure braking is ensured in accordance with the driver's operation.

[Brake Control Operation Due to System Startup After Depression in the Side of Progressive Depression]

As described above, when the system is started after the depression of the pedal, it is necessary to eliminate the discomfort with respect to elongation operation and the discomfort associated with a feeling of a stiff board in response to the pedal depression operation. The brake control operation reflecting these considerations on the side of pedal progressive depression due to system startup after depression will now be described below on the basis of FIGS. 2 and 4.

When a determination is made that the is greater than S0 (i.e. stroke>S0) and that the system has been started after depressing pedal, in the flowchart of FIG. 2, the process proceeds from S101, through steps S102, S103 to Step S104.

Then, in step S103, the wheel cylinder cut valve 8, that has been held open prior to system startup, is now closed, and in step S104, the stroke simulator cut valve 9, that has been closed prior to the system startup, is maintained in a closed state. Subsequently, during the time in which any of the conditions stated in steps from SS105 to S114 is not satisfied, in the flowchart in FIG. 2, the flow from step S104 to step S114 through steps S105, S108, and S111 will be repeated.

Thus, when it is detected that system has been started after depression of the brake pedal 1, firstly through a closing operation of the stroke simulator cut valve 9, the inflow of the brake fluid to the stroke simulator 6 is cut off so that an increase in the pedal stroke is suppressed.

Therefore, with the increase of the pedal stroke being held suppressed, as shown by the direction from Pa to Pb in FIG. 4, the fluid pressure P generated by the master cylinder 4 increases and exceeds the normal characteristic fluid pressure Pn.

Then, upon the condition P−Pn>P1 being satisfied, in the flowchart of FIG. 2, the process proceeds from step S105 to step S107 through step S106. In step S106, while the wheel cylinder cut valve 8 is held closed, in step S107, the command for switching the state of the stroke simulator cut valve 9 from the closed to the open state is outputted.

Thus, when the detection has been made that the driver is trying to progressively advance the pedal stroke to the side of depression (P−Pn>P1), the stroke simulator cut valve 9 will be opened in accordance with the fluid pressure increase amount. Along this opening operation of the stroke simulator cut valve 9 in accordance with the fluid pressure increase amount, due to the inflow of the brake fluid into the stroke simulator 6 associated therewith, as shown by the direction Pb→Pc in FIG. 4, the operation of progressive depression of the brake may be allowed while receiving a pedal reaction force.

Then, by the stroke increase, when the pressure approaches the normal characteristic fluid pressure Pn, and the condition of (−P2<P−Pn≤P1) is satisfied, in the flowchart of FIG. 2, control proceeds from step S108 to step S110 through step S109. In step S109, while the wheel cylinder cut valve 9 is maintained to be closed, in step S110, a command is output to switch the stroke simulator cut valve from open to closed state. Due to this closing operation of the stroke simulator cut valve, the inflow of the brake fluid into the stroke simulator 6 is cut off again so that, while the pedal stroke is being suppressed, as shown by the direction from Pc→Pd, the fluid pressure generated by the master cylinder 4 increases.

As described above, at the system startup after depressing the pedal, on the side of stepping the pedal, the "fluid pressure increase" due closing of the stroke simulator cut valve 9 (Pa→Pb, Pc→Pd, FIG. 4) and the "stroke increase" (Pb→Pc in FIG. 4) due to opening of the stroke simulator cut valve 9 are repeated. When this "fluid pressure increase" and the "stroke increase" are repeated a plurality of times along the "normal characteristics", as shown in FIG. 4, the stroke-fluid pressure characteristics approximated along the "normal characteristics" may be achieved.

Therefore, at the system startup after depression of the pedal, the "elongated stroke" will be avoided, that would otherwise occur when allowing for the brake fluid to flow into the stroke simulator with the stroke simulator cut valve being maintained open. Further, at the time of system startup after depression of the pedal, the feeling of "stepping on stiff board" is prevented, that would otherwise occur by preventing the inflow of brake fluid to the stroke simulator while the stroke simulator cut valve remains closed. Thus, the pedal depression feeling may be obtained similar to the stroke-fluid pressure characteristics in the normal start up.

[Brake Control Operation to the Pedal Returning Side Due to System Startup After Depression]

As described above, in the case in which the system has been started after depression of the pedal, when a pedal returning operation is performed subsequent to the pedal depressing operation, it is necessary to resolve the shortage in pedal reaction force and a defective pedal return. With reference to FIGS. 2 and 5, description is given of the brake control operation due to the system startup after depression of the pedal, which reflects these situations.

At the system startup after depression of the pedal, when the brake pedal 1 is operated from the depressing operation to a pedal returning or releasing operation, the condition of ($-P2<P-Pn\le P1$) is satisfied, and, in the flowchart in FIG. 2, the control proceeds from step S108 to step S110 through step S109. Further, in step s109, with the wheel cylinder cut valve 8 remaining closed, in step S110, a command is output to switch the stroke simulator cut valve 9 from the open to the closed state.

Thus, when a transition is made to the pedal returning operation from the depression operation, firstly, the communication between the booster device 13 and the master cylinder 4 remains shut off. In addition, by the closing operation of the stroke simulator cut valve 9, the inflow of brake oil to the stroke simulator 6 is interrupted so that the pedal stroke will be suppressed. Thus, as shown by the direction Pe→Pf in FIG. 5, the fluid pressure P generated by the master cylinder 4 decreased less than the "normal characteristic" without the pedal stroke being decreased.

Then, upon the condition ($P-Pn\le -P2$) being satisfied, in the flowchart of FIG. 2, the process proceeds from step S111 to step S113 through step S112. In step S112, a command is output to change the wheel cylinder cut valve 8 from the closed to open state, while in step S113, the stroke simulator cut valve 9 is maintained closed.

Thus, when the detection was made that the driver attempts to return the brake pedal 1 (i.e., $P-Pn\le -P2$), the wheel cylinder cut valve 8 is opened, and the boosted fluid or hydraulic pressure from the booster or pressure increasing device 13 is introduced to the master cylinder 4. Due to the introduction to the master cylinder 4 of the boosted hydraulic pressure, as shown by the direction, Pf→Pg in FIG. 5, the fluid or hydraulic pressure of the master cylinder 4 rises and the pedal stroke is returned by the inflow of the brake fluid to the master cylinder 4.

Further, due to the fluid pressure increase of the master cylinder 4 and the stroke return, the fluid pressure P approaches the "normal characteristics", and when the condition of ($-P2<P-Pn\le P1$) s satisfied, in the flowchart of FIG. 3, the control proceeds from step S108 to step S110 through step S109. Further, in step S109, a command is output to switch the wheel cylinder cut valve 8 from the open to the closed state, and in step S110, the stroke simulator cut valve 9 is maintained closed. By this closing operation of the stroke simulator cut valve 8, the booster device 13 and the master cylinder 4 is disconnected again, and as shown by the direction Pg→Ph in FIG. 5, the fluid pressure P generated by the master cylinder 4 decreased below the "normal characteristics" without the pedal stroke being decreased.

As described above, at the system startup after depression of the pedal, on the pedal return side, the "fluid pressure decrease" (Pe→Pf, Pg→Pf, FIG. 5) due to closing of the wheel cylinder cut valve 8 and the "fluid pressure increase/stroke decrease (Pf→Pg, Ph→Pi in FIG. 5) due to the opening of the wheel cylinder cut valve 8 are repeated. By repeating these "fluid pressure decrease" and the "fluid pressure increase/stroke decrease" several times along the "normal characteristic", as shown in FIG. 5, the stroke-fluid pressure characteristic approximated to the "normal characteristic" may be achieved.

Thus, when performing the pedal returning operation after the operation of pedal depression, when the generated fluid pressure decreases below the "normal characteristics", the wheel cut valve 8 is opened to increase the fluid pressure by introducing the boosted fluid pressure into the master cylinder 4 along with maintaining of the return stroke. Upon reaching the "normal characteristics", the wheel cylinder cut valve 8 is closed, and, when the fluid pressure decreases again below the "normal characteristics" due to the pedal return, the wheel cylinder cut valve 8 will be opened. By reiterating these steps, the discomfort that "the pedal reaction force is not enough" or "the brake pedal 1 won't return" will be resolved. In addition, the feeling of pedal returning operation equivalent to the stroke-fluid pressure characteristics in the normal startup.

A brake control device for a vehicle according to one or more embodiments of the present invention may obtain one or more of the following advantages.

Specifically the brake control device for a vehicle comprises:

(1) a master cylinder 4 to convert an operating force of a brake pedal 1 to a fluid pressure, a wheel cylinder 12 installed in each wheel for generating a braking force by a fluid pressure introduced in each wheel, an introduction section (stroke simulator 6) that introduces the fluid pressure generated by the master cylinder 4;

a first switching valve (wheel cylinder cut valve 8) disposed in a fluid passage 15 connecting the master cylinder 4 and the wheel cylinder 12 and configured to close at the system startup and to open at the time of system non-startup/failure, and a second switching valve (stroke simulator cut valve 9) disposed in a branch fluid passage 16 connecting the master cylinder 4 and the introduction section and configured to open at the system startup and to close at the system non-startup/failure, and a brake control unit (FIG. 2) that is configured, when the system is started after the depression operation of the brake pedal, to close the second switching valve (stroke simulator), and when the fluid pressure generated by the master cylinder 4 increases, to cause the second switching valve (stroke simulator cut valve 9) to open in accordance with the fluid pressure increase amount to allow for the brake fluid to flow into the introduction section (stroke simulator 6).

Thus, at a system startup after depression operation of the brake pedal 1, the discomfort of pedal operation associated with the "stroke extension" and "stepping on stiff board) may be eliminated.

(2) The brake control unit (FIG. 2) is operative, when the system is started after the depression of the brake pedal 1, to control to selectively open and close the second switching valve (stroke simulator cut valve 9) along a normal stroke-fluid pressure characteristics shown or exhibited when the system is started without depression operation on the brake pedal 1 (steps S105 to S110).

Therefore, in addition to advantage (1), even when the system is started after the depression operation of the pedal, the feeling of the pedal depression operation may be obtained similar to the normal stroke-fluid pressure characteristics with a normal startup.

(2) When boosted after the system startup, a booster device 13 is provided to produce a boosted fluid pressure to be introduced in the wheel cylinder 12, separately or independently from the fluid pressure from the master cylinder 4, wherein, the brake control unit (FIG. 2) is configured, when a returning operation is performed after the depression operation of the brake pedal 1, to close the first switching valve (wheel cylinder cut valve 8), and when the fluid pressure generated by the master cylinder 4 decreases, to open the first switching valve (wheel cylinder cut valve 8) in accordance to the fluid pressure decrease amount to introduce the boosted fluid pressure in the master cylinder 4.

Thus, when the system is started after the depression operation of the brake pedal 1, the "pedal reaction force shortage" on the pedal returning operation and the pedal operational discomfort associated with the "defective pedal return" may be eliminated.

(4) The brake control unit (FIG. 2) is operative, when the system is started after depression of the brake pedal 1, to control to selectively open and close the first switching valve (wheel cylinder cut valve 8) to conform the normal stroke-fluid pressure characteristics in which the system is started without the depression operation of the brake pedal 1 (steps S18 to S113). Thus, even in the case of system startup after depression operation of the pedal, the operational feeling of the pedal may be obtained similar to the stroke-fluid pressure characteristics in a normal startup.

(5) The introduction section is a stroke simulator 6 that introduces the hydraulic pressure generated by the master cylinder 4 and produces a pedal reaction force. Therefore, it is possible to ensure a good pedal feeling which does not give an uncomfortable feeling to the driver at the progressive pedal depression side.

The brake control device for a vehicle has been described above with reference to embodiments of the present invention. The specific structure is not limited to the above embodiments. Design change, addition or the like are acceptable without departing from the spirit of the invention defined in each of the appended claims.

Above, as the introduction section, an example of stroke simulator 6 is shown in which the fluid pressure generated by the master cylinder 4 is introduced to produce a pedal reaction force. However, as the introduction section, instead of the stroke simulator, simply a reservoir tank may be used, which introduces the fluid pressure generated by the master cylinder.

Above, an example is shown in which the stroke simulator 6, the wheel cylinder cut valve 8, the stroke simulator cut valve 9 are disposed between the master cylinder 4 and the wheel cylinder 12. However, as long as the stroke simulator, the first switching valve (wheel cylinder cut valve), and the second switching valve (stroke simulator cut valve) are respectively disposed between the master cylinder and the wheel cylinder so as for the present invention to be executable, other component may be added.

Above, such an example has been illustrated in which an existing wheel cylinder cut valve 8 is used as the first switching valve while an existing stroke simulator cut valve 9 is used as the second switching valve. However, the existing wheel cylinder cut valve together with a solenoid valve for open/close control added in parallel thereto may be used as the first switching valve. Further, the existing stroke simulator cut valve and the solenoid valve for open/close control added in parallel thereto may be used as the second switching valve.

The brake control device for a vehicle according to the present invention may be applied to vehicles of various types such as an engine driven vehicle, a hybrid vehicle, an electric vehicle, fuel cell vehicle etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A brake control device for a vehicle having a semi-brake-by-wire system, comprising:
    a master cylinder that converts an operating force of a brake pedal to a fluid pressure;
    a wheel cylinder installed in each wheel of the vehicle that generates a braking force by a fluid pressure introduced in each wheel;
    a fluid pressure receiving structure that receives the fluid pressure generated by the master cylinder;
    a first switching valve disposed in a fluid passage connecting the master cylinder and the wheel cylinder;
    a second switching valve disposed in a branch fluid passage connecting the master cylinder and the fluid pressure receiving structure; and
    a brake controller operable to open the first switching valve and the second switching valve to be at open states and close the first switching valve and the second switching valve to be at closed states,
    wherein, at system startup before the depression operation of the brake pedal, the first switching valve is at the closed state and the second switching valve is at the open state,
    wherein, at system non-startup/failure, the first switching valve is at the open state and the second switching valve is at the closed state,
    wherein, when the system is started after the depression operation of the brake pedal;
        the first switching valve and the second switching valve are at closed states, and
        after the fluid pressure generated by the master cylinder increases due to the first switching valve and the second switching valve being at the closed states, the second switching valve is opened in accordance with fluid pressure increase amount generated by the master cylinder to allow for the brake fluid to flow into the fluid pressure receiving structure.

2. The brake control device of claim 1, wherein, when the system is started after the depression of the brake pedal, the brake controller opens and closes the second switching valve in accordance with normal stroke-fluid pressure characteristics corresponding to when the system is started without depression operation on the brake pedal.

3. The brake control device of claim 2, further comprising:
    a booster device that, when boosted after the system startup, produces a boosted fluid pressure to be introduced in the wheel cylinder separately from the fluid pressure from the master cylinder,
    wherein, when a returning operation is performed after the depression operation of the brake pedal, the brake controller closes the first switching valve, and
    wherein, when the fluid pressure generated by the master cylinder decreases, the brake controller opens the first switching valve in accordance with fluid pressure decrease amount to introduce the boosted fluid pressure from the booster device into the master cylinder.

4. The brake control device of claim 3,
wherein, when the system is started after depression of the brake pedal, the brake controller selectively opens and closes the first switching valve in accordance with the normal stroke-fluid pressure characteristics.

5. The brake control device of claim 1, wherein the fluid pressure receiving structure is a stroke simulator that receives a fluid pressure generated by the master cylinder and produces a pedal reaction force.

6. The brake control device of claim 1, further comprising:
   a booster device that, when boosted after the system startup, produces a boosted fluid pressure to be introduced in the wheel cylinder separately from the fluid pressure from the master cylinder,
   wherein, when a returning operation is performed after the depression operation of the brake pedal, the brake controller closes the first switching valve, and
   wherein, when the fluid pressure generated by the master cylinder decreases, the brake controller opens the first switching valve in accordance with fluid pressure decrease amount to introduce the boosted fluid pressure from the booster device into the master cylinder.

7. The brake control device of claim 6,
wherein, when the system is started after depression of the brake pedal, the brake controller selectively opens and closes the first switching valve in accordance with the normal stroke-fluid pressure characteristics.

8. The brake control device of claim 2, wherein the fluid pressure receiving structure is a stroke simulator that receives a fluid pressure generated by the master cylinder and produces a pedal reaction force.

9. The brake control device of claim 3, wherein the fluid pressure receiving structure is a stroke simulator that receives a fluid pressure generated by the master cylinder and produces a pedal reaction force.

10. The brake control device of claim 4, wherein the fluid pressure receiving structure is a stroke simulator that receives a fluid pressure generated by the master cylinder and produces a pedal reaction force.

11. The brake control device of claim 6, wherein the fluid pressure receiving structure is a stroke simulator that receives a fluid pressure generated by the master cylinder and produces a pedal reaction force.

12. The brake control device of claim 7, wherein the fluid pressure receiving structure is a stroke simulator that receives a fluid pressure generated by the master cylinder and produces a pedal reaction force.

* * * * *